(12) United States Patent
Seki et al.

(10) Patent No.: US 11,378,872 B2
(45) Date of Patent: Jul. 5, 2022

(54) PROJECTOR STAND

(71) Applicant: Izumi-Cosmo Co., Ltd., Osaka (JP)

(72) Inventors: Kazuharu Seki, Tokyo (JP); Shuhei Kameda, Tokyo (JP); Teruyuki Abe, Tokyo (JP)

(73) Assignee: IZUMI-COSMO CO., LTD., Osaka (JP)

( * ) Notice: Subject to any disclaimer, the term of this patent is extended or adjusted under 35 U.S.C. 154(b) by 454 days.

(21) Appl. No.: 16/614,039

(22) PCT Filed: Apr. 3, 2018

(86) PCT No.: PCT/JP2018/014198
§ 371 (c)(1),
(2) Date: Nov. 15, 2019

(87) PCT Pub. No.: WO2018/211841
PCT Pub. Date: Nov. 22, 2018

(65) Prior Publication Data
US 2021/0124243 A1    Apr. 29, 2021

(30) Foreign Application Priority Data

May 16, 2017   (JP) .............................. JP2017-097640

(51) Int. Cl.
*G03B 21/10*          (2006.01)
*F16M 11/10*         (2006.01)
(Continued)

(52) U.S. Cl.
CPC ......... *G03B 21/10* (2013.01); *F16M 11/2092* (2013.01); *F16M 11/24* (2013.01);
(Continued)

(58) Field of Classification Search
CPC ........ G03B 21/54; G03B 21/10; A47B 97/00; A47B 97/08; A47B 97/04; F16M 11/02;
(Continued)

(56) References Cited

U.S. PATENT DOCUMENTS

| 1,778,635 A | * | 10/1930 | Heisler | ................... | F16M 11/10 |
| | | | | | 248/650 |
| 2008/0142667 A1 | * | 6/2008 | German | ................. | F16M 13/02 |
| | | | | | 248/447.1 |

(Continued)

FOREIGN PATENT DOCUMENTS

| DE | 19951306 A1 | * | 4/2001 | ............. G03B 21/28 |
| GB | 2456023 A | * | 7/2009 | ............. A47B 97/08 |

(Continued)

OTHER PUBLICATIONS

English language International Search Report for PCT/JP2018/014198, dated Jul. 3, 2018 (1 page).

(Continued)

*Primary Examiner* — Tan Le
(74) *Attorney, Agent, or Firm* — Flynn Thiel, P.C.

(57) ABSTRACT

A projector stand includes an elevator member fitted to a strut such that the elevator member can be raised and lowered, a guide plate fixed to the upper end of the elevator member, a slide member horizontally movable along the guide plate, and a three-axis adjustment mechanism provided or the slide member.

2 Claims, 3 Drawing Sheets

(51) Int. Cl.
  *F16M 11/20*   (2006.01)
  *F16M 11/24*   (2006.01)
  *F16M 11/42*   (2006.01)
  *F16M 11/02*   (2006.01)
  *F16M 11/12*   (2006.01)
  *F16M 11/04*   (2006.01)
  *A47B 97/00*   (2006.01)
  *G03B 21/54*   (2006.01)

(52) U.S. Cl.
  CPC .............. *F16M 11/42* (2013.01); *A47B 97/00* (2013.01); *F16M 11/02* (2013.01); *F16M 11/046* (2013.01); *F16M 11/12* (2013.01); *G03B 21/54* (2013.01)

(58) Field of Classification Search
  CPC ...... F16M 11/046; F16M 11/42; F16M 11/10; F16M 11/12; F16M 11/24; F16M 11/2092
  See application file for complete search history.

(56) References Cited

U.S. PATENT DOCUMENTS

| | | | |
|---|---|---|---|
| 2010/0188642 A1* | 7/2010 | Falendysz | G03B 21/30 353/119 |
| 2013/0134280 A1* | 5/2013 | Botting | G06F 3/0425 248/371 |
| 2020/0064717 A1* | 2/2020 | Seki | G03B 21/10 |

FOREIGN PATENT DOCUMENTS

| | | | |
|---|---|---|---|
| JP | 2005121918 A | * | 5/2005 |
| JP | 2007-193120 A | | 8/2007 |
| JP | 2012-226197 A | | 11/2012 |
| JP | 2013-015730 A | | 1/2013 |
| JP | 2014-032402 A | | 2/2014 |
| JP | 2015-187681 A | | 10/2015 |

OTHER PUBLICATIONS

Japanese language International Search Report and Written Opinion for PCT/JP2018/014198, dated Jul. 3, 2018 (9 pages).

* cited by examiner

PROJECTOR STAND

TECHNICAL FIELD

The present invention relates to a projector stand, and more specifically to a movable projector stand suitable for an ultra-short throw projector.

BACKGROUND ART

Heretofore, a stand that supports a projector capable of projecting an image toward a top board of a table from above has been known (Patent Document 1).

PRIOR ART DOCUMENT

Patent Document 1

Japanese Laid-Open Patent Application No. 2007-193120

SUMMARY OF THE INVENTION

Incidentally, since the stand disclosed in Patent Document 1 is attached to an edge of a table by using a clamping mechanism, there has been a problem that the work associated with attaching and detaching the stand to and from the table is cumbersome.

In view of the foregoing, the present invention provides a projector stand supporting an ultra-short throw projector that projects an image downward toward a projection surface of a projected body from above, the projector stand being characterized by including: a movable base member having a rotatable wheel; a strut provided in a standing manner on the base member; an elevator member provided in the strut such that the elevator member can be raised and lowered; an elevator mechanism that raises and lowers the elevator member; and an angular adjustment mechanism that is supported by the elevator member and to which the ultra-short throw projector is attachable.

According to such a configuration, the work associated with attaching and detaching the projector stand to and from the projected body is unnecessary, and the projector stand can be easily moved to the location of the projected body. Moreover, the height of the projector when supported on the projector stand can be adjusted according to the height of the projected body. Hence, it is possible to provide a versatile and easy-to-use projector stand.

DETAILED DESCRIPTION

Figure 1:
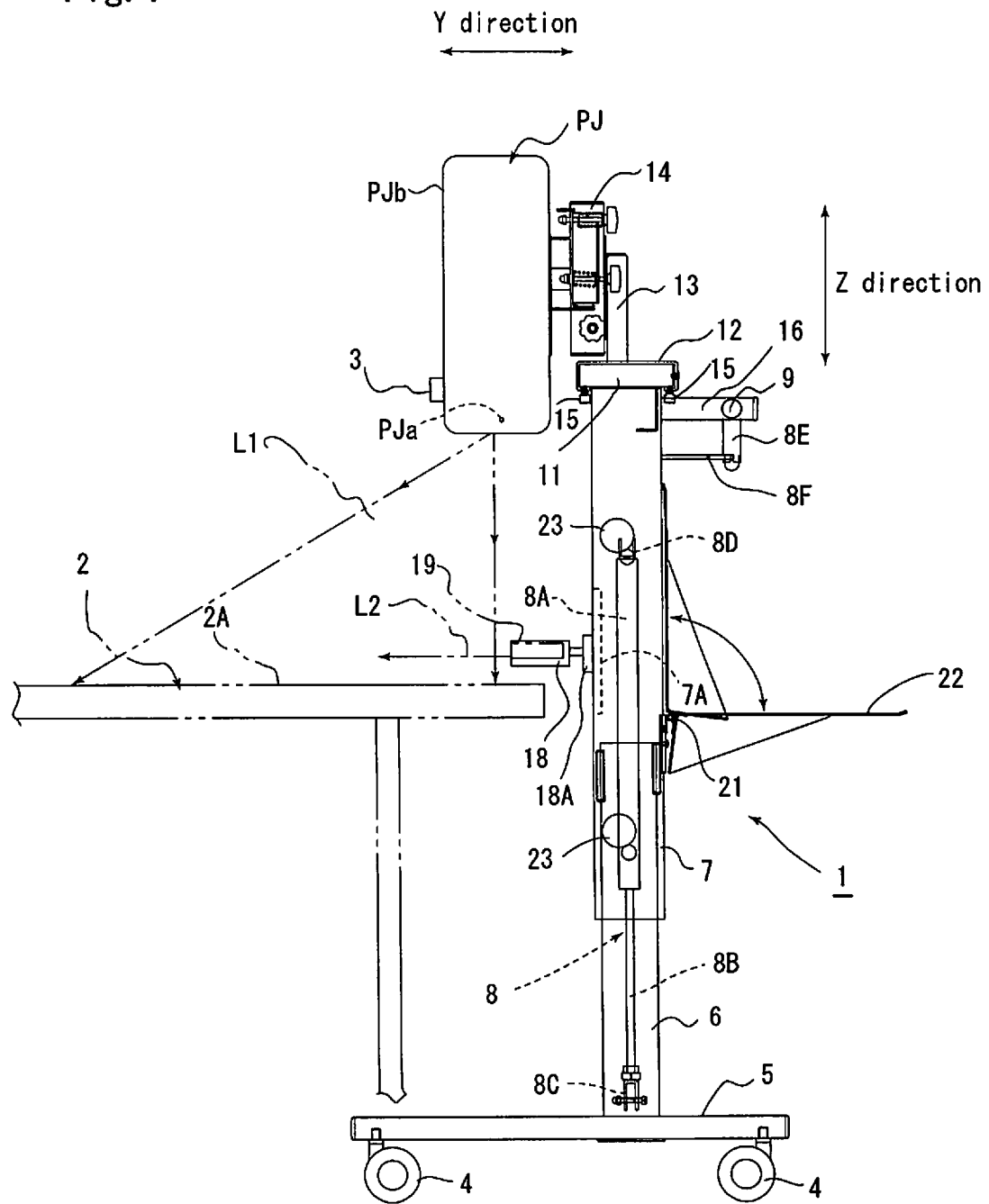
FIG. 1 is a front view showing an example of the present invention.
Figure 2:
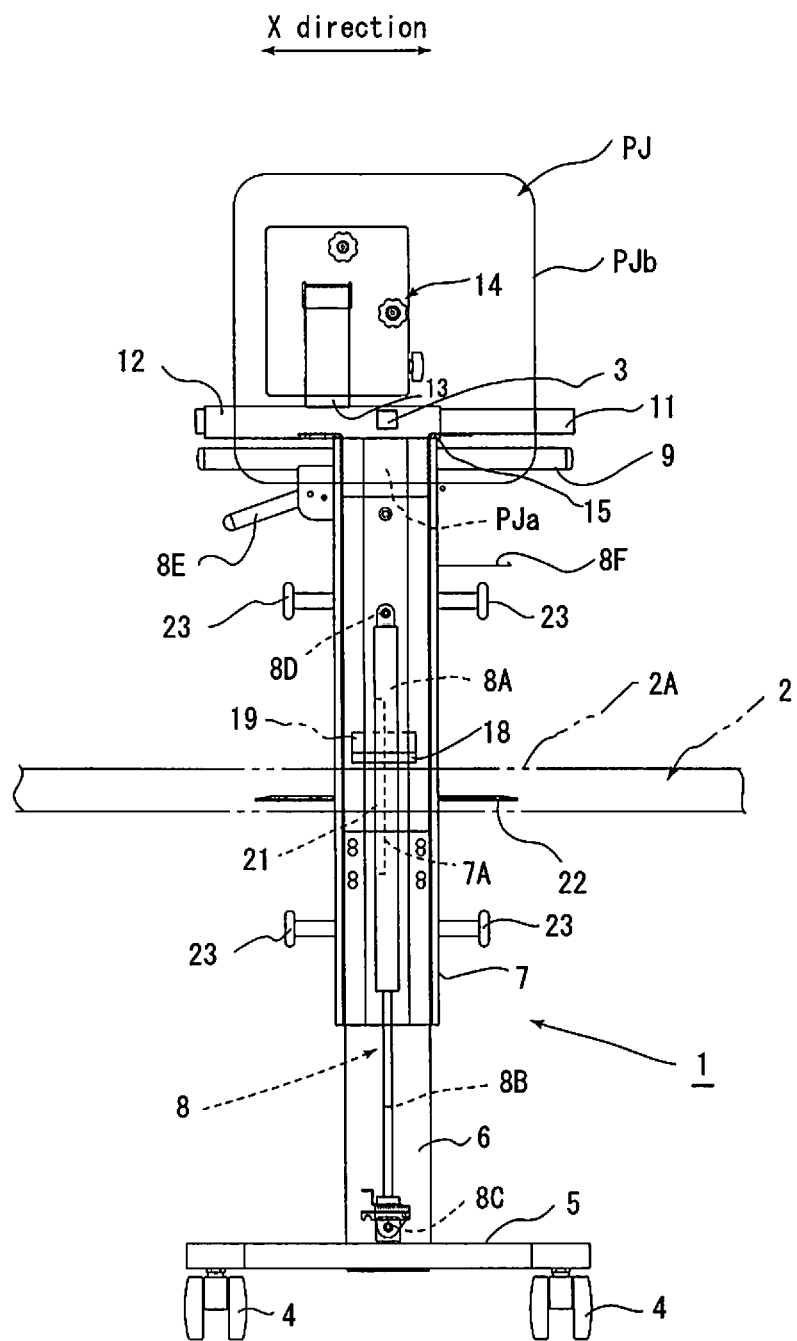
FIG. 2 is a left side view of FIG. 1.
Figure 3:
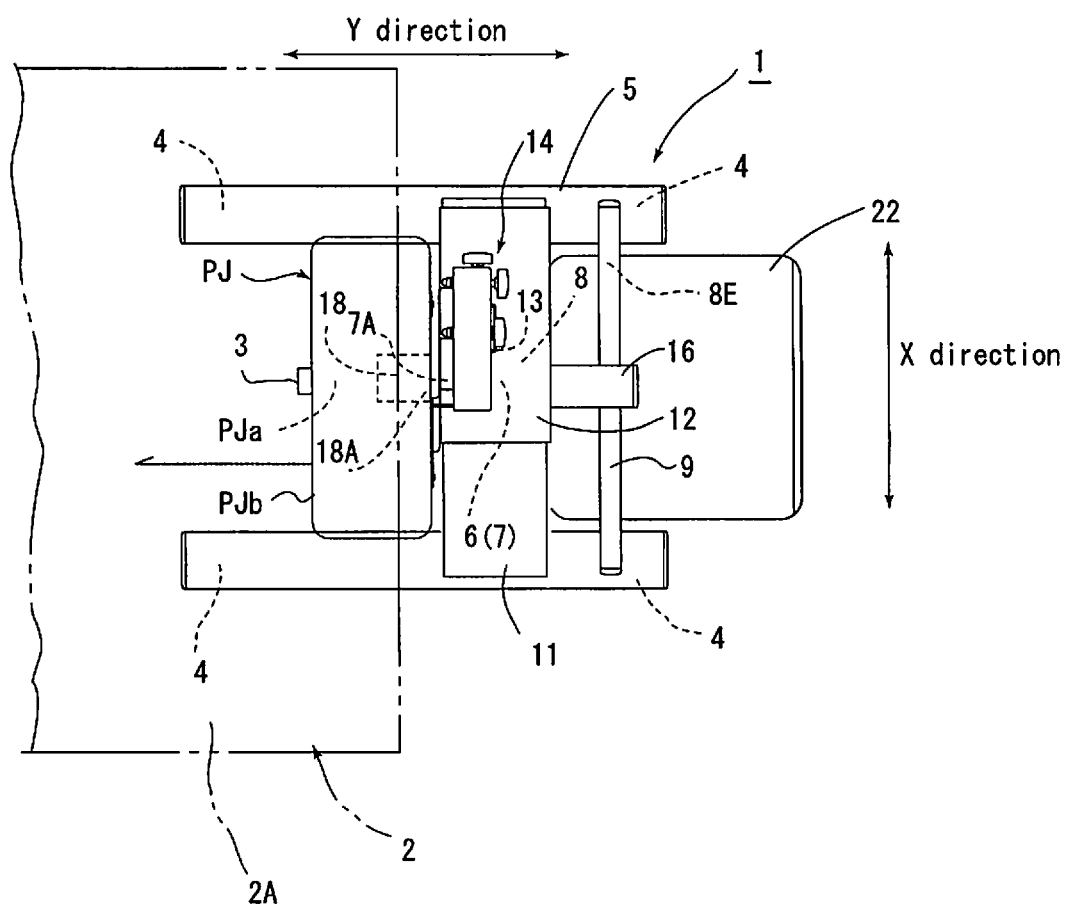
FIG. 3 is a plan view of FIG. 1.

Hereinafter, the present invention will be described with reference to an example shown in the drawings. In FIGS. 1 to 3, reference numeral 1 denotes a projector stand, the projector stand 1 supporting an ultra-short throw projector PJ and movable to a desired position.

The configuration of the ultra-short throw projector PJ has conventionally been known. By projecting projection light L1 downward toward a top board 2A of a table 2 from a projection lens PJa of the ultra-short throw projector PJ, an image can be projected on the top board 2A of the table 2.

In the example, it is assumed that the projected body is the table 2, and the flat top board 2A of the table 2 is a projection surface on which an image is projected.

The ultra-short throw projector PJ includes a box-shaped casing PJb, and a sensor 3 is attached to a predetermined position on a front surface of the casing PJb so as to face the top board 2A of the table 2. When an operator moves a pen on the top board 2A of the table 2 while an image is projected on the top board 2A by the projection light L1, the sensor 3 can detect the movement of the pen.

The projector stand 1 of the example supports the ultra-short throw projector PJ capable of projecting an image toward the top board 2A (projection surface) of the table 2 from above, is movable to a desired position, and is capable of easily varying the height position and horizontal supporting position of the ultra-short throw projector PJ.

The projector stand 1 includes an H-shaped base member 5 provided with four wheels 4 on a lower surface thereof, a square tube-shaped strut 6 fixed so as to extend vertically upward in a center portion of the base member 5, a square tube-shaped elevator member 7 slidably fitted to the strut 6 from above, a gas spring 8 that raises and lowers the elevator member 7 and fixes the elevator member 7 at a desired height, a guide plate 11 horizontally fixed at the upper end of the elevator member 7, a slide member 12 slidably attached to the guide plate 11, and a three-axis adjustment mechanism 14 fixed to the slide member 12 through a bracket 13.

In the example, the ultra-short throw projector PJ is supported by being attached to the three-axis adjustment mechanism 14. The three-axis adjustment mechanism 14 can fine-tune the optical axis of the projection lens PJa of the ultra-short throw projector PJ in direction X and direction Y intersecting on a horizontal plane and in the vertical direction Z. Note that since the configuration of the three-axis adjustment mechanism 14 as an angular adjustment mechanism for adjusting the angle of the optical axis of the projection lens PJa is known, description of the configuration is omitted.

The wheels 4 are attached in four positions on the lower surface of the base member 5, which keeps the base member 5 horizontal and allows the entire projector stand 1 including the base member 5 to be moved to a desired position. An unillustrated stopper is provided in two rear wheels 4 of the wheels 4 in four positions, and the stopper can fix the rear wheels 4 and keep the projector stand 1 in a stopped state.

The strut 6 is fixed so as to extend vertically upward in the center portion of the base member 5, and the elevator member 7 is fitted to an outer peripheral portion of the strut 6 such that the elevator member 7 can be raised and lowered. Then, the conventionally known gas spring 8, which acts as an elevator mechanism, is disposed inside the strut 6 and the elevator member 7.

The gas spring 8 includes a cylinder 8A having a gas chamber or the like formed therein, and a piston 8B slidably fitted to the cylinder 8A. A lower attachment portion 8C which is a lower end portion of the piston 8B is connected to the base member 5, and an upper attachment portion 8D which is the upper end of the cylinder 8A is connected to an upper part of the elevator member 7 with a connection pin. An operation lever 8E of the gas spring 8 is provided in a handle 9 positioned in an upper part, and the operation lever 8E works in conjunction with the inside of the cylinder 8A through a cable 8F.

When the operator holds and grips the operation lever 8E, the lock of the elevator member 7 by the gas spring 8 is released, and the elevator member 7 can be raised or lowered to a desired height in the released state. Since an upward energization force of the gas spring 8 acts during the raising or lowering operation, the operator can raise or lower the elevator member 7 and the ultra-short throw projector PJ supported thereabove with a small force.

Then, when the operator lets go of the operation lever 8E, the operation lever 8E returns to its original non-operating position, and the piston 8B of the gas spring 8 becomes locked. Hence, the elevator member 7 and the ultra-short throw projector PJ supported thereabove become fixed at a desired height position.

The guide plate 11 is fixed in a horizontal state at the upper end of the elevator member 7, and the slide member 12 having a U-shaped section is slidably engaged with the guide plate 11. This allows the slide member 12 to move in direction X along the longitudinal direction of the guide plate 11.

The three-axis adjustment mechanism 14 is connected to a longitudinal center portion of the slide member 12 through the bracket 13, and the ultra-short throw projector PJ can be attached to the three-axis adjustment mechanism 14.

Two fixing screws 15, 15 are attached to a longitudinal end portion of the slide member 12 on a lower surface thereof, and by screwing in these fixing screws 15 and pushing their tip ends against a lower surface of the guide plate 11, the slide member 12 can be fixed in a desired position of the guide plate 11 in the longitudinal direction (direction X). On the other hand, by loosening the fixing screws 15, it is possible to move the slide member 12, the three-axis adjustment mechanism 14, and the ultra-short throw projector PJ supported thereby to a desired position of the guide plate 11 in the longitudinal direction (direction X).

Thus, in a state where the ultra-short throw projector PJ is supported by the three-axis adjustment mechanism 14, it is possible to move the ultra-short throw projector PJ in parallel in direction X of a horizontal plane through the slide member 12 and the three-axis adjustment mechanism 14.

The handle 9 is connected in a horizontal state to a rear surface of the slide member 12 through a bracket 16, and the operation lever 8E of the gas spring 8 is attached to the handle 9. In a state where the slide member 12 is fixed to the guide plate 11 with both of the fixing screws 15, the operator grips the handle 9 and pushes or pulls the entire projector stand 1 to move it.

When the ultra-short throw projector PJ is attached to the three-axis adjustment mechanism 14 with the projection lens PJa directed downward, the three-axis adjustment mechanism 14 can fine-tune the optical axis of the projection lens PJa of the ultra-short throw projector PJ in direction X, direction Y, and direction Z.

A vertical guide groove 7A is formed on a front surface of the elevator member 7, and a base portion 18A of a sensor attachment portion 18 is attached to the guide groove 7A such that the base portion 18A can be raised and lowered. The sensor attachment portion 18 is supported horizontally, and is capable of adjusting the height position of the sensor attachment portion 18 along the guide groove 7A if necessary. An optical sensor 19 is attached horizontally to the sensor attachment portion 18.

The optical sensor 19 is configured in a conventionally known manner and emits a laser beam L2. When the optical sensor 19 is activated while the optical sensor 19 is attached to the sensor attachment portion 18, the optical sensor 19 can emit the laser beam L2 along direction Y of a horizontal plane in a position above and in the vicinity of the top board 2A of the table 2. When the operator moves the pen on the top board 2A in this state, the movement of the pen can be detected by the optical sensor 19. Note that such a configuration of the optical sensor 19 is known, and therefore a detailed description is omitted.

A flat plate-shaped bench 22 is swingably attached to a position at a predetermined height on a rear surface of the elevator member 7 through a hinge 21. When not in use, the bench 22 is directed vertically upward and brought into close contact with the rear surface of the elevator member 7. On the other hand, when in use, the bench 22 is drawn to the near side and positioned so that the entire bench 22 extends horizontally. In this state, a personal computer, desired equipment, or the like can be placed on the bench 22.

Additionally, an upper and lower pair of hooks 23, 23 around which an electrical cord is wound and held are arranged on right and left side surfaces of the elevator member 7.

As has been described, the projector stand 1 of the example is movable to a desired position, and can raise and lower the ultra-short throw projector PJ supported by the three-axis adjustment mechanism 14 through the elevator member 7 and other parts. Moreover, the ultra-short throw projector PJ supported by the three-axis adjustment mechanism 14 can be moved in direction X of a horizontal plane by the slide member 12.

With the configuration described above, the projector stand 1 of the example is used in the following manner. Specifically, first, in a location away from the table 2, the operator attaches the ultra-short throw projector PJ to the three-axis adjustment mechanism 14 such that the projection lens PJa is directed vertically downward. The operator also attaches the optical sensor 19 horizontally to the sensor attachment portion 18.

When the ultra-short throw projector PJ and the optical sensor 19 are supported to the projector stand 1 in this manner, the operator releases the wheels 4 fixed by the stopper, and then grips the handle 9 to push and move the projector stand 1 to the location of the table 2. Then, after moving the projector stand 1 to a location where the optical sensor 19 and the ultra-short throw projector PJ are positioned above the top board 2A of the table 2, the operator fixes the wheels 4 with the stopper (state shown in FIGS. 1 to 3).

Thereafter, the operator grips the operation lever 8E of the gas spring 8 to release the lock of the elevator member 7, and in the released state, raises or lowers the elevator member 7, lets go of the operation lever 8E at a desired height position, and locks the elevator member 7 by the gas spring 8. With this, the ultra-short throw projector PJ is supported at a height position where the range of the projection light L1 from the projection lens PJa is suitable for the size of the top board 2A of the table 2.

Thereafter, the operator loosens the fixing screws 15 of the slide member 12, and then moves the slide member 12, the three-axis adjustment mechanism 14, and the ultra-short throw projector PJ by a desired amount in direction X of a horizontal plane along the guide plate 11. Thereafter, the operator tightens the fixing screws 15 and fixes the slide member 12 to the guide plate 11.

Although the arrangement position of the projection lens PJa of the ultra-short throw projector PJ differs among manufacturers, in the example, the ultra-short throw projector PJ can be moved in parallel by the slide member 12. Hence, it is possible to stop the ultra-short throw projector PJ at a suitable position in direction X according to the difference in arrangement position of the projection lens PJa of each ultra-short throw projector PJ.

Thereafter, the operator fine-tunes the optical axis of the projection lens PJa of the ultra-short throw projector PJ in direction X and direction Y of a horizontal plane and in the vertical direction Y by using the three-axis adjustment mechanism 14.

Next, the operator raises or lowers the sensor attachment portion 18 supporting the optical sensor 19 along the guide grove 7A to adjust the supporting height of the optical sensor 19. Specifically, the optical sensor 19 is set to a position where the laser beam L2 emitted horizontally from the optical sensor 19 is one to two millimeters above the top board 2A of the table 2.

Thus, adjustment of the height and position in direction X of the projection lens PJa of the ultra-short throw projector PJ and adjustment of the height position of the optical sensor 19 are completed.

Thereafter, if necessary, the operator can position the bench 22 horizontally and place a personal computer or the like on the bench 22 to perform required work.

Thereafter, since the projection light L1 is projected downward onto the top board 2A of the table 2 from the projection lens PJa of the ultra-short throw projector PJ, an image is projected on the top board 2A. Then, when the operator moves the pen and writes a character or the like while the image is thus projected on the top board 2A, the movement of the pen is detected by the operating optical sensor 19 and the sensor 3, whereby the trajectory of the movement of the pen is projected on the top board 2A of the table 2 through the projection lens PJa of the ultra-short throw projector PJ.

As has been described, since the projector stand 1 of the example includes the base member 5 having the wheels 4, it is possible to move the projector stand 1 easily to a desired position. Additionally, since the projector stand 1 also includes the elevator member 7 and the gas spring 8 for raising and lowering the elevator member 7, it is possible to easily adjust the height position of the ultra-short throw projector PJ in a state where the ultra-short throw projector PJ is attached to the three-axis adjustment mechanism 14.

Moreover, the ultra-short throw projector PJ supported by the three-axis adjustment mechanism 14 is movable in direction X of a horizontal plane by the slide member 12. Hence, the position of the projection lens PJa can be set to a suitable position in direction X according to the difference in the ultra-short throw projector PJ of each manufacturer. Hence, a versatile projector stand 1 can be provided.

Additionally, the sensor attachment portion 18 to which the optical sensor 19 can be attached is provided, and the sensor attachment portion 18 can adjust the supporting height of the optical sensor 19. Accordingly, after attaching the optical sensor 19 to the attachment portion 18, it is possible to easily adjust the height of the optical sensor 19.

Hence, according to the example, it is possible to provide the projector stand 1 that does not require the work associated with attaching and detaching to and from the table 2, is versatile, and is easy to use.

Note that the attachment portion 18 for the optical sensor 19 of the above example may be omitted. Additionally, while the projected body is the table 2 in the above example, the projected body may instead be another type of fixed structure, as long as the projected body includes a projection portion formed of a horizontal flat surface.

Note that while the ultra-short throw projector PJ is supported by being attached to the three-axis adjustment mechanism 14 in the above example, a conventionally known two-axis adjustment mechanism may be used instead of the three-axis adjustment mechanism 14. That is, a two-axis adjustment mechanism may be used as the angular adjustment mechanism for adjusting the angle of the optical axis of the projection lens PJa. As has been known conventionally, according to a two-axis adjustment mechanism, it is possible to fine-tune the optical axis of the projection lens PJa in direction X and direction Y of a horizontal plane.

The invention claimed is:

1. A projector stand supporting an ultra-short throw projector that projects an image downward toward a projection surface from above, the projector stand comprising:
   a movable base member having a rotatable wheel;
   a strut provided in a standing manner on the base member;
   an elevator member provided on the strut such that the elevator member can be raised and lowered;
   an elevator mechanism that raises and lowers the elevator member;
   an angular adjustment mechanism supported by the elevator member, the ultra-short throw projector being attachable to the angular adjustment mechanism;
   a guide plate fixed to an upper end of the elevator member; and
   a slide member provided on the guide plate so as to be horizontally movable and provided with the angular adjustment mechanism, wherein in a state where the ultra-short throw projector is attached to the angular adjustment mechanism, the ultra-short throw projector is horizontally movable via the slide member and the angular adjustment mechanism.

2. The projector stand according to claim 1, wherein the elevator mechanism comprises a gas spring provided in the strut and the elevator member, and the projector stand further comprises a sensor attachment portion provided on the elevator member such that the sensor attachment portion can be raised and lowered, and an optical sensor is attachable to the sensor attachment portion.

* * * * *